(12) United States Patent
Yasuda

(10) Patent No.: US 8,919,963 B2
(45) Date of Patent: Dec. 30, 2014

(54) PROJECTOR AND METHOD FOR CONTROLLING THE SAME

(75) Inventor: Yutaka Yasuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 311 days.

(21) Appl. No.: 12/951,145

(22) Filed: Nov. 22, 2010

(65) Prior Publication Data

US 2011/0128454 A1 Jun. 2, 2011

(30) Foreign Application Priority Data

Nov. 30, 2009 (JP) ................. 2009-272647

(51) Int. Cl.
| | | |
|---|---|---|
| *G03B 21/26* | (2006.01) | |
| *G03B 21/00* | (2006.01) | |
| *H04N 7/18* | (2006.01) | |
| *H04N 9/31* | (2006.01) | |

(52) U.S. Cl.
CPC ........... *H04N 9/3197* (2013.01); *H04N 9/3194* (2013.01)
USPC .............................. 353/28; 353/121; 348/135

(58) Field of Classification Search
CPC ........ G03B 21/26; G03B 17/54; G03B 29/00; G06F 3/0425; G06F 3/0386; H04N 9/3197; H04N 9/3194; G09F 19/18
USPC ................ 353/30, 28, 40, 121, 122; 348/135; 434/314, 324, 325

See application file for complete search history.

(56) References Cited

U.S. PATENT DOCUMENTS

| | | | |
|---|---|---|---|
| 7,113,169 B2 * | 9/2006 | Gnanamgari et al. | ........ 345/158 |
| 7,524,066 B2 | 4/2009 | Sato | |
| 2006/0033884 A1 * | 2/2006 | Sato | ................. 353/30 |
| 2006/0221063 A1 * | 10/2006 | Ishihara | ........................ 345/173 |
| 2009/0128716 A1 * | 5/2009 | Nagashima et al. | .......... 348/756 |

FOREIGN PATENT DOCUMENTS

| | | |
|---|---|---|
| JP | 2004-198858 A | 7/2004 |
| JP | 2009-157307 A | 7/2009 |

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

A projector includes: an image modulation section that modulates light emitted from a light source in accordance with a video signal to form an optical image; a projection section that enlarges and projects the optical image; a drawing area setting section that sets a drawing area within an image modulation area where the light is modulated to form the optical image, the drawing area being an area where a template image is drawn; and a template image generating section that generates the template image to be drawn in the drawing area.

16 Claims, 8 Drawing Sheets

PROJECTOR AND METHOD FOR CONTROLLING THE SAME

CROSS-REFERENCE

The present application claims priority from Japanese Patent Application No. 2009-272647 filed on Nov. 30, 2009, which is hereby incorporated by reference in its entirety.

BACKGROUND

In recent years, there has been known a method for giving a presentation by using a whiteboard as a projection screen and projecting an image on the white board. Using a projector this way allows the presenter to directly write comments and underlines with a marker pen on the whiteboard and create a table on the whiteboard for organized discussion or other purposes in the course of the presentation.

Japanese Patent Publication No. 2004-198858 discloses a projection apparatus in which a built-in or removable memory stores a template image formed of a plurality of ruler lines and when the projector is in use, the stored template image is projected on a screen in response to predetermined operation. Since the projection apparatus described in Japanese Patent Publication No. 2004-198858 can project the template image formed of a plurality of ruler lines on the screen, the user does not have to directly write a table with a maker pen on the screen, resulting in improvement in workability.

The projector described in Japanese Patent Publication No. 2004-198858, however, usually projects the template image formed of ruler lines over the entire projection area. Since the template image is thus enlarged and projected over the nearly entire surface of the whiteboard, the user cannot write a memo, a minute, or other notes on the whiteboard as long as the template image is projected. That is, the user cannot arbitrarily set the ratio of the template image to the projection area.

SUMMARY

Various embodiments may provide a projector that allows the user to arbitrarily set the ratio of the template image to the projection area and a method for controlling the projector.

A projector according to at least one embodiment of the disclosure includes an image modulation section that modulates light emitted from a light source in accordance with a video signal to form an optical image, a projection section that enlarges and projects the optical image, a drawing area setting section that sets a drawing area within an image modulation area where the light is modulated to form the optical image, the drawing area being an area where a template image is drawn, and a template image generating section that generates the template image to be drawn in the drawing area.

According to the configuration described above, since a drawing area where a template image is drawn can be set, the template image will not be drawn outside the drawing area. That is, since the template image is projected only on part of a projection surface, the template image formed, for example, of ruler lines or grids projected on the projection surface will not prevent the user from writing other notes in the other portion and allows the user to use the projection surface for other purposes.

It is preferable that the projector according to the aspect of the invention further includes an imaging section that captures an image projected through the projection section, and that the drawing area setting section sets the drawing area based on drawing area specifying information contained in the image captured by the imaging section.

According to the configuration described above, for example, when the user uses a marker pen or any other suitable drawing tool to draw marks for specifying a template image projection area on the projected image, the projector can acquires the marks on the captured image as the drawing area specifying information. The user can therefore specify the drawing area without switching to a menu screen or any other similar screen.

It is preferable that the drawing area setting section sets the drawing area in accordance with drawing area specifying operation for specifying the drawing area.

According to the configuration described above, the projector can acquire drawing area specifying information, for example, by allowing the user to specify the drawing area from a menu screen or any other suitable screen. The invention is therefore applicable to a projector with no imaging section.

It is preferable that the drawing area setting section sets the shape of the drawing area in accordance with an input of shape specifying information for specifying the shape of the drawing area.

According to the configuration described above, since the shape of the drawing area can be set, the projection surface can be more effectively used.

It is preferable that the template image generating section generates a template image in accordance with the size of the drawing area.

According to the configuration described above, since a template image according to the size of the specified drawing area is drawn, for example, the drawing area where ruler lines or grids are drawn will not be too smaller or greater than the image modulation area, whereby a well-balanced template image can be projected.

It is preferable that the template image generating section generates the template image in accordance with an input of type specifying information for specifying the type of the template image.

According to the configuration described above, since the type of the template image can be specified, the template image can be changed in accordance with the user's intention as appropriate, whereby an effective presentation can be given.

According to at least one embodiment of the disclosure, there is provided a method for controlling a projector including an image modulation section that modulates light emitted from a light source in accordance with a video signal to form an optical image and a projection section that enlarges and projects the optical image. The method includes setting a drawing area within an image modulation area where the light is modulated to form the optical image, the drawing area being an area where a template image is drawn, and generating the template image to be drawn in the drawing area.

According to the configuration described above, since a drawing area where a template image is drawn can be set, the template image will not be drawn outside the drawing area. The template image formed, for example, of ruler lines or grids projected on part of the projection surface will not prevent the user from writing other notes in the other portion and allows the user to use the projection surface for other purposes.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

A projector and a method for controlling the same according to a preferred embodiment of the disclosure will be described below in detail with reference to the drawings.

Figure 1:
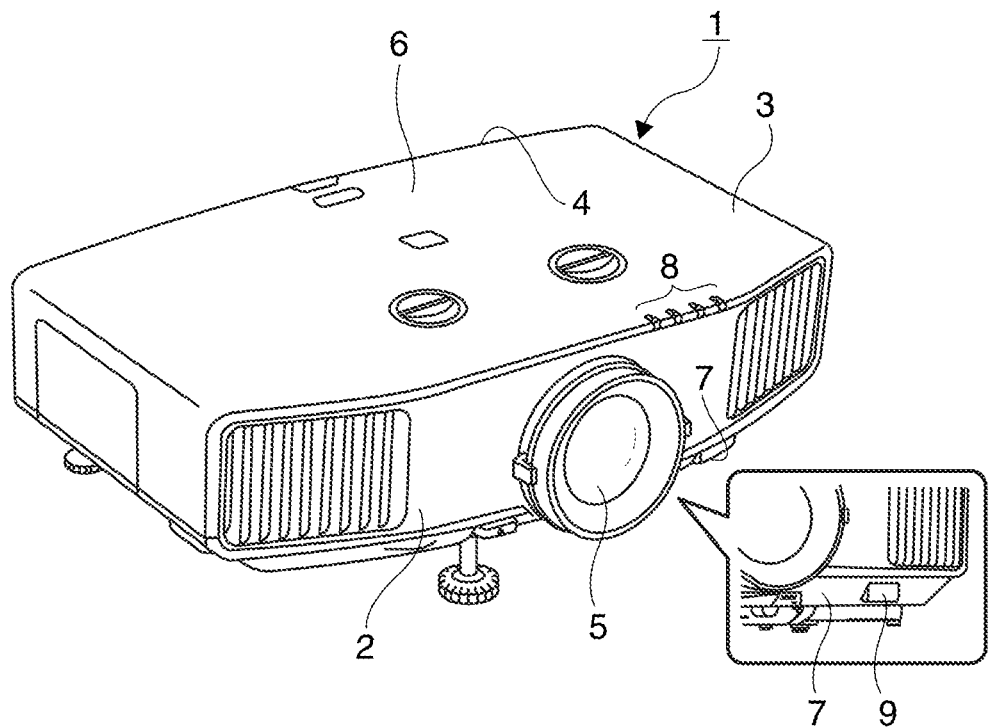
FIG. 1 is an exterior schematic view of a projector of an embodiment.

As shown in FIG. 1, a projector 1 covered with a housing 3 has a projection lens 5 provided through a front surface 2 of the housing 3 and indictors 8 provided on an upper surface 6 of the housing 3 but close to the front surface 2 and showing operation statuses of the projector 1. A receiver 9 that receives an output signal from a remote control unit RC (hereinafter referred to as a "remote control RC"), which will be described later, is provided on the front side of a lower surface 7 that faces away from the upper surface 6 of the housing 3.
Internal Configuration of Projector An internal configuration of the projector of the present embodiment will next be described with reference to FIG. 2.

Figure 2:
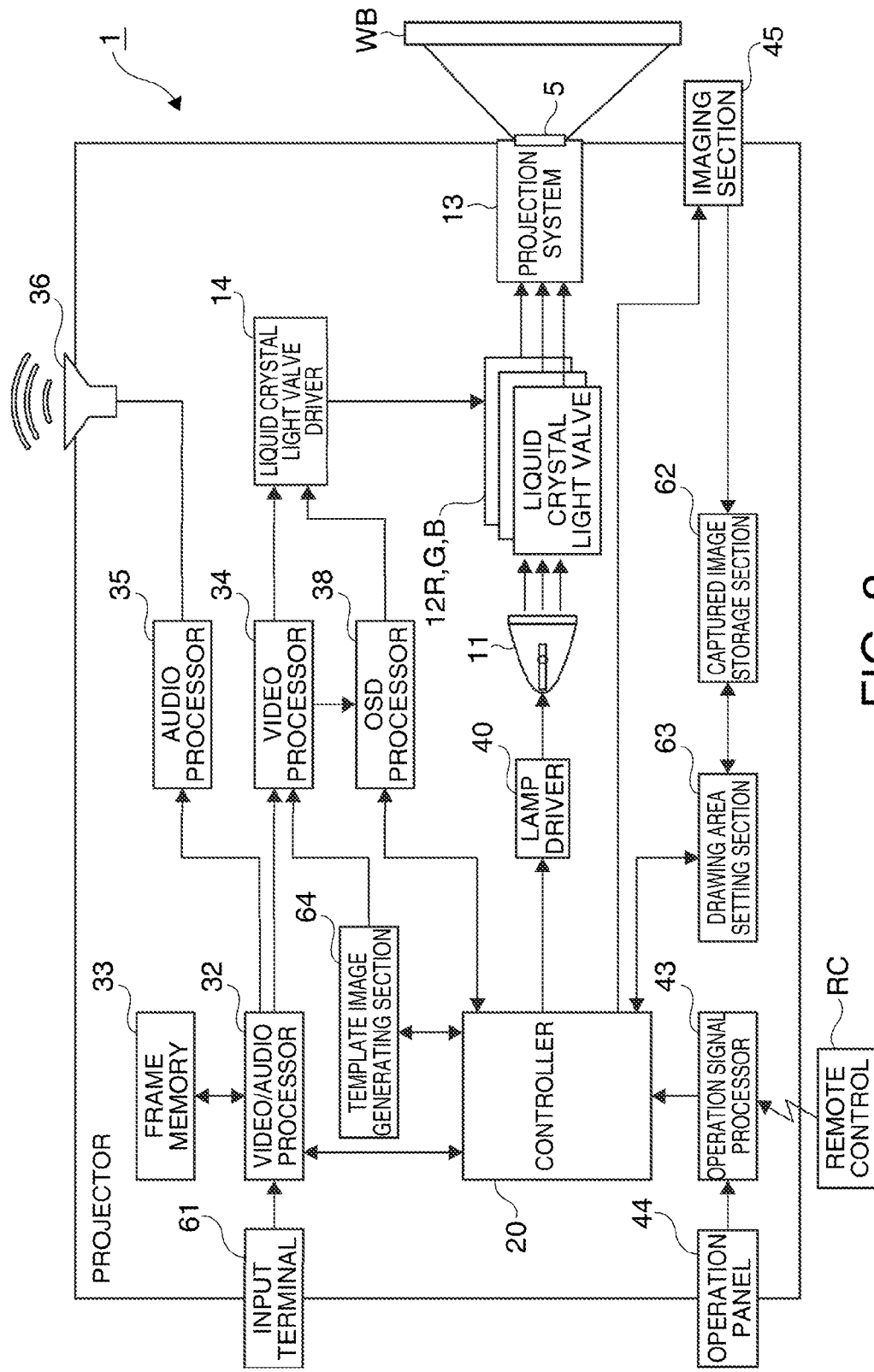
FIG. 2 is a block diagram showing an internal configuration of the projector of the embodiment.

As shown in FIG. 2, the projector 1 includes a lamp 11, which is a light source, liquid crystal light valves 12R, 12G, and 12B (hereinafter referred to as "liquid crystal light valves 12R, G, and B"), which are light modulators, a projection system 13, a liquid crystal light valve driver 14, a controller 20, a video/audio processor 32, a frame memory 33, a video processor 34, an audio processor 35, a loudspeaker 36, an OSD (On Screen Display) processor 38, a lamp driver 40, an operation signal processor 43, an operation panel 44, an imaging section 45, an input terminal 61, a captured image storage section 62, a drawing area setting section 63, and a template image generating section 64.

The projection system 13 (projection section) includes a projection lens 5. The projector 1 produces an optical image according to a video signal supplied through the input terminal 61 and enlarges and projects the optical image through the projection lens 5 on a screen, a white wall, a whiteboard, or any other suitable projection surface (hereinafter referred to as "whiteboard WB" in the present embodiment).

The lamp 11 in the present embodiment is, for example, a discharge lamp, but not limited thereto, and may be an LED light source, a laser light source, or any other light source.

The controller 20 is connected to the video/audio processor 32, the OSD processor 38, the lamp driver 40, the operation signal processor 43, the imaging section 45, the drawing area setting section 63, and the template image generating section 64. The controller 20 includes a microprocessor, a rewritable, nonvolatile storage section, and a primary storage section directly accessible by the microprocessor. The nonvolatile storage section stores, for example, a control program for controlling a variety of actions of the projector 1, drawing mode setting menu video images for setting a drawing area, OSD information for producing OSD video images for displaying the amount of trapezoidal distortion correction and other values, and a variety of setting values used in the projector 1.

The microprocessor executes the control program and other programs stored in the nonvolatile storage section to perform centralized control of the actions of the projector 1, perform computational operation on a variety of pieces of data inputted from the components connected to the controller 20, and output the computation results to the components.

The video/audio processor 32 decodes a video signal received through the input terminal 61 into video data, which will be compressed and encoded later, converts the video data, for example, into an RGB signal, and continuously outputs the RGB signal to the video processor 34. An audio signal inputted through an audio input terminal is similarly decoded, converted into audio data in a D/A conversion process, and continuously outputted to the audio processor 35. The frame memory 33 is connected to the video/audio processor 32, which writes the video data on a frame basis in the frame memory 33 and reads the video data stored in the frame memory 33.

The video processor 34 performs gamma correction, trapezoidal distortion correction, resolution conversion, and other image processing on the RGB signal received from the video/audio processor 32 and outputs the resultant signal to the liquid crystal light valve driver 14.

The liquid crystal light valve driver 14 drives the liquid crystal light valves 12R, 12G, and 12B in accordance with the inputted RGB signal. Each of the liquid crystal light valves 12R, G, and B (image modulation sections) has a plurality of pixels arranged in a matrix. The liquid crystal light valve driver 14 adjusts the transmittance of each of the pixels so that R (red), G (green), and B (blue) light fluxes emitted from the lamp 11 and separated by a color separation system are modulated by the respective liquid crystal light valves 12R, G, and B and resultant optical images are outputted. The optical images outputted from the liquid crystal light valves 12R, G, and B are combined in a light combining system, such as a cross dichroic prism, and enlarged and projected through the projection lens 5 in the projection system 13 on the whiteboard WB. The projection system 13 further includes a focus mechanism that can change the position where the projected light is focused and a zoom mechanism that can change the magnification of the projected light.

The audio processor 35 outputs the audio data received from the video/audio processor 32 to the loudspeaker 36. The audio processor 35 includes a sound level amplifier, amplifies the level of sound, and outputs the amplified sound to the loudspeaker 36. The loudspeaker 36 receives the amplified analog audio signal and outputs it.

The OSD processor 38 receives OSD information, such as menu video images and video images for detecting the video input terminal, from the controller 20 and produces OSD video images. The OSD processor 38 combines the produced OSD video images and the video data received from the video processor 34 and transmits the combined data to the liquid crystal light valve driver 14.

The lamp driver 40 turns on or off the lamp 11 in accordance with an instruction from the controller 20. When the lamp 11 is, for example, a high-pressure discharge lamp, the lamp driver 40 is formed of a turn-on circuit that applies an ignition voltage, a stabilizer that supplies an adequate lamp current, and other components.

The operation signal processor 43 receives an operation signal inputted from the operation panel 44 or the remote control RC and outputs the operation signal to the controller 20.

The imaging section 45, which includes a CCD (Charge Coupled Device) sensor, a CMOS (Complementary Metal Oxide Semiconductor) sensor, or any other suitable imaging device, images the projection surface on which the video light having exited through the projection system 13 of the projector 1 is projected, which is the whiteboard WB in the present embodiment. The imaging section 45 images the area of the whiteboard WB that contains at least a projected image in response to an instruction from the controller 20. The imaged data (captured image) are stored in the captured image storage section 62.

The drawing area setting section 63 sets a drawing area where a template image is drawn within the image modulation area formed of the pixels of each of the liquid crystal light valves 12R, G, and B in response to an instruction from the controller 20. The drawing area setting section 63 sets the drawing area based on drawing area specifying information contained in the imaged data acquired by the imaging section 45. The drawing area can alternatively be set in accordance with drawing area specifying operation for specifying the drawing area. The drawing area setting section 63 further sets the shape of the drawing area in accordance with an input of shape specifying information for specifying the shape of the drawing area.

The template image generating section 64 generates a template image. The template image generating section 64 converts image data containing the generated template image into an RGB signal and outputs it to the video processor 34. In the present embodiment, the template image is a standard image, such as ruler lines and grids. Providing the template image generating section 64 in the projector 1 allows the projector 1 alone to project ruler lines or grids without connecting the projector 1 to a personal computer or any other similar apparatus.

The template image generating section 64 generates a template image in proportion to the size of the drawing area set by the drawing area setting section 63. For example, the width and the number of ruler lines or the cell size of the grids can be changed in accordance with the ratio of the drawing area to the image modulation areas. The template image generating section 64 generates a template image also in accordance with an input of type specifying information for specifying the type of template image. The type specifying information contains the type and the width of ruler lines, the color of the template image, and other factors.

Setting Drawing Area

Example 1

Figure 3:
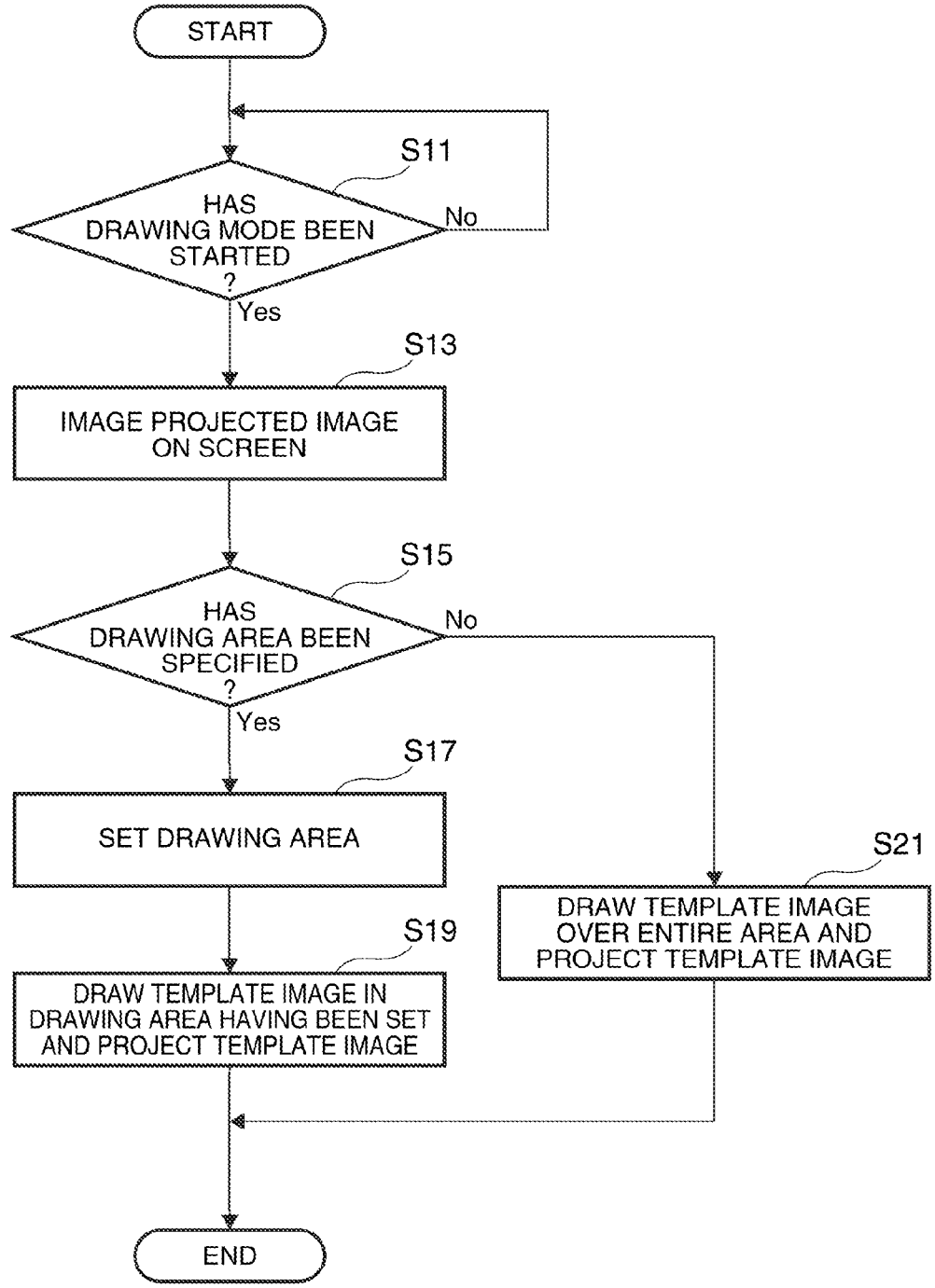
FIG. 3 is a flowchart for describing a process of setting a drawing area in Example 1.

A description will next be made of a drawing area setting process performed by the projector of the present embodiment. In Example 1, a description will be made of a case where the user sets a drawing area by using drawing area setting information, specifically, area specifying marks drawn with a marker pen or any other suitable drawing tool on the whiteboard WB, with reference to FIGS. 3 to 5.

A user considers a case where the user wants to project ruler lines as a guide to writing characters when writing a minute of a conference or any other meeting on part of the whiteboard WB and first draws marks with a marker pen in desired positions on the whiteboard WB. For example, when the user wants to specify a rectangular area, the user draws four "+" marks. The user then uses an operation button on the remote control RC or the operation panel 44 to issue an instruction to start a drawing mode for projecting ruler lines.

Figure 4:
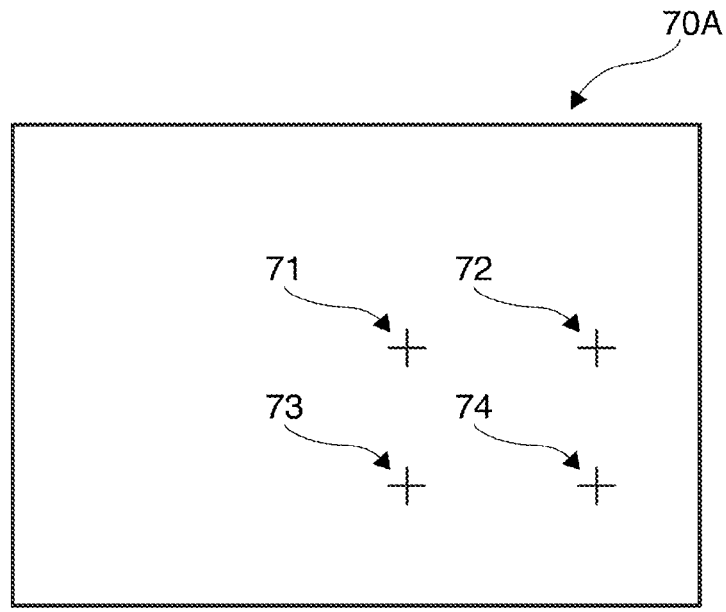
FIG. 4 shows an example of imaged data acquired by an imaging section equipped in the projector of the embodiment.

Having received an operation signal from the operation signal processor 43, the controller 20 starts the drawing mode (step S11: Yes) and instructs the imaging section 45 to image the whiteboard WB. The imaging section 45 images the whiteboard WB in response to the instruction from the controller 20 (step S13) and acquires imaged data. FIG. 4 shows an example of the imaged data. As shown in FIG. 4, imaged data 70A contains four marks 71, 72, 73, and 74 drawn by the user.

The drawing area setting section 63 converts the imaged data 70A stored in the captured image storage section 62 into data sized to be drawn on the liquid crystal light values 12R, G, and B in according with the number of pixels thereof and acquires the coordinates of the four marks 71, 72, 73, and 74 in response to an instruction from the controller 20.

Figure 5:
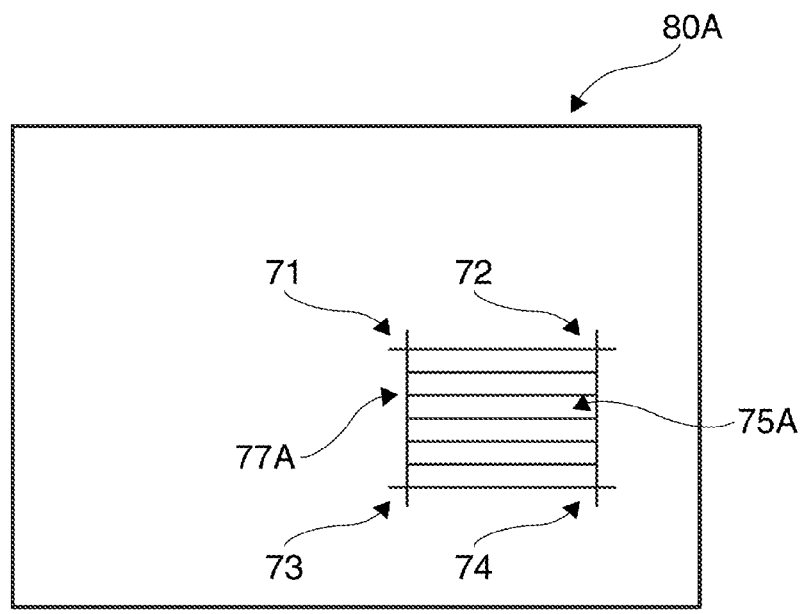
FIG. 5 shows an example of image data containing a template image drawn in a drawing area.

The drawing area setting section 63, when it has successively acquired the coordinates of the marks 71, 72, 73, and 74, determines that a drawing area has been specified (step S15: Yes) and sets the area defined by the four points as a drawing area 75A (step S17). After the drawing area 75A is set, the controller 20 instructs the template image generating section 64 to generate a template image to be drawn in the drawing area 75A. The template image generating section 64 generates image data 80A containing a template image 77A drawn in the drawing area 75A, as shown in FIG. 5, in response to the instruction from the controller 20, converts the image data 80A into an RGB signal, and outputs it to the video processor 34.

The video processor 34 performs gamma correction, trapezoidal distortion correction, resolution conversion, and other image processing on the RGB signal carrying the image data 80A received from the template image generating section 64 and outputs the resultant data to the liquid crystal light valve driver 14. The liquid crystal light valve driver 14 drives the liquid crystal light valves 12R, G, and B to draw the image according to the inputted RGB signal in the image modulation areas thereof so as to form optical images, and the projection system 13 projects the optical images. That is, ruler lines are projected on part of the whiteboard WB when the liquid crystal light valve driver 14 draws the template image 77A on the pixels corresponding to the drawing area 75A within the image modulation areas of the liquid crystal light valves 12R, G, and B (step S19).

On the other hand, when the drawing area setting section 63 determines in step S15 that the coordinates of the four marks 71, 72, 73, and 74 cannot be acquired and hence no drawing area has been specified (step S15: No), the controller 20 instructs the template image generating section 64 to generate a template image to be drawn over the entire image modulation areas of the liquid crystal light valves 12R, G, and B. That is, the template image generating section 64 generates a template image drawn over the entire image modulation areas in response to the instruction from the controller 20, converts the template image into an RGB signal, and outputs it to the video processor 34.

The video processor 34 performs gamma correction, trapezoidal distortion correction, resolution conversion, and other image processing on the RGB signal carrying the template image received from the template image generating section 64 and outputs the resultant data to the liquid crystal light valve driver 14. Ruler lines are projected substantially over the entire whiteboard WB (step S21) when the liquid crystal light valve driver 14 draws the template image according to the inputted RGB signal on the pixels corresponding to the image modulation areas of the liquid crystal light valves 12R, G, and B.

Figure 6:
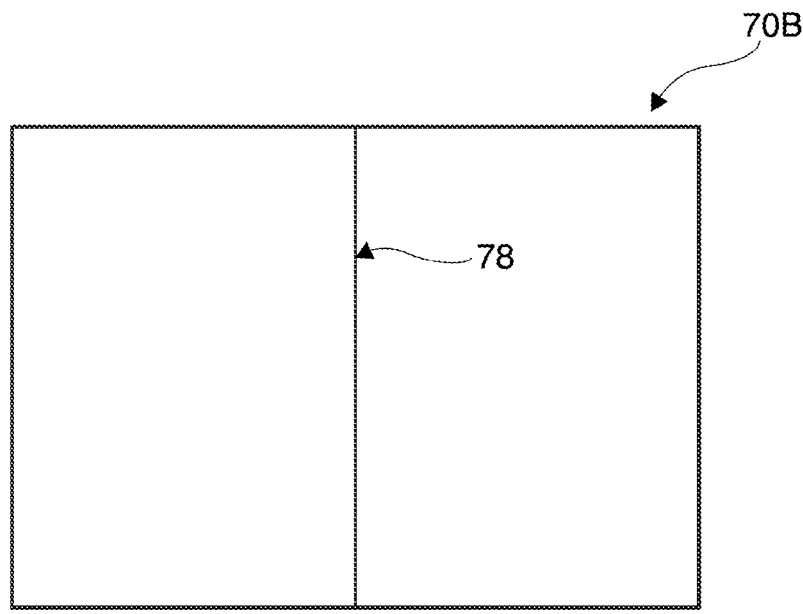
FIG. 6 shows another example of imaged data acquired by the imaging section.
Figure 7:
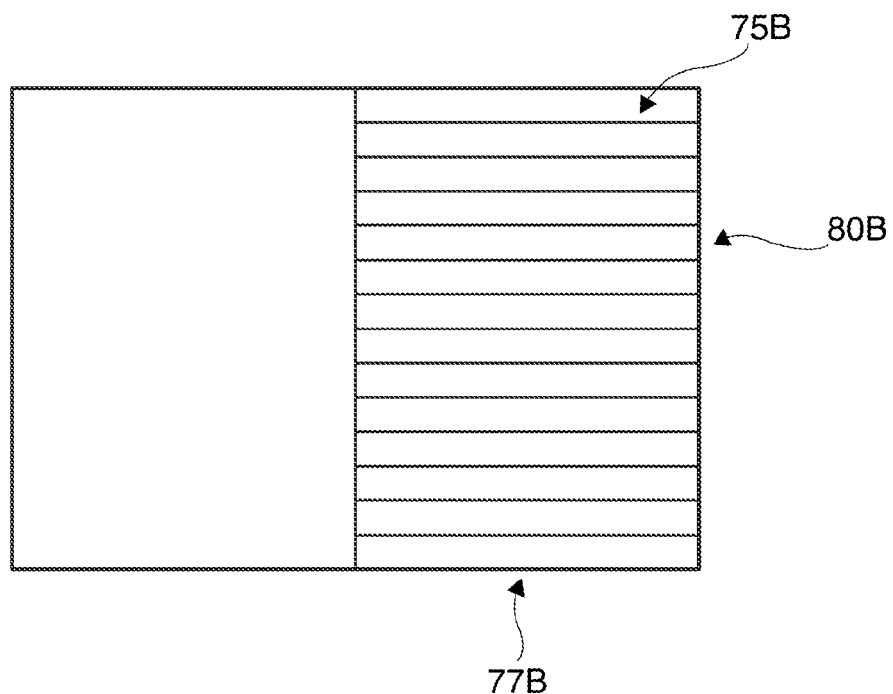
FIG. 7 shows another example of image data containing a template image drawn in a drawing area.

The drawing area is specified with four points in the example described above. Alternatively, only two points that form a diagonal of a rectangle may be specified. Further, the drawing area is not limited to a rectangle but may be specified with a line 78 that halves each of the image modulation areas, as shown in FIG. 6 illustrating imaged data 70B. When each of the image modulation areas is halved, either of the areas obtained by halving image data 80B is set as a drawing area 75B, and a template image 77B formed of ruler lines is drawn in the drawing area 75B, as shown in FIG. 7.

Figure 8:
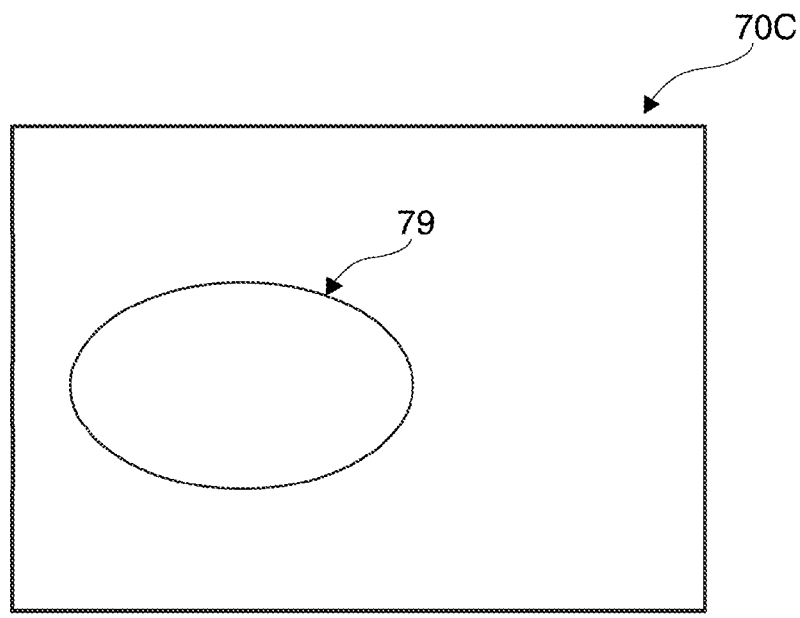
FIG. 8 shows another example of imaged data acquired by the imaging section.
Figure 9:
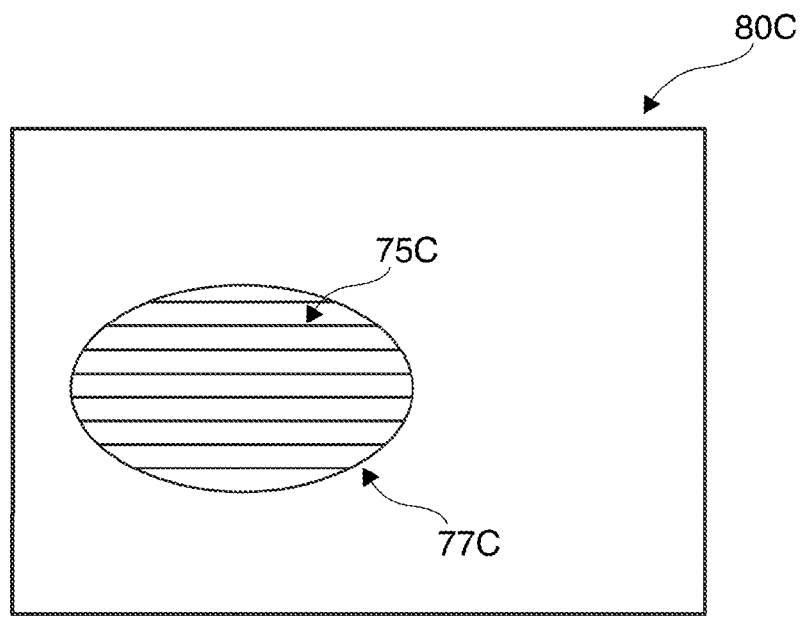
FIG. 9 shows another example of image data containing a template image drawn in a drawing area.

Still alternatively, the drawing area may be specified with an ellipse 79, as shown in FIG. 8 illustrating imaged data 70C. When the drawing area is specified with the ellipse 79, the area of image data 80C that is within the ellipse is set as a drawing area 75C, and a template image 77C formed of ruler lines is drawn in the drawing area 75C, as shown in FIG. 9.

Example 2

Figure 10:
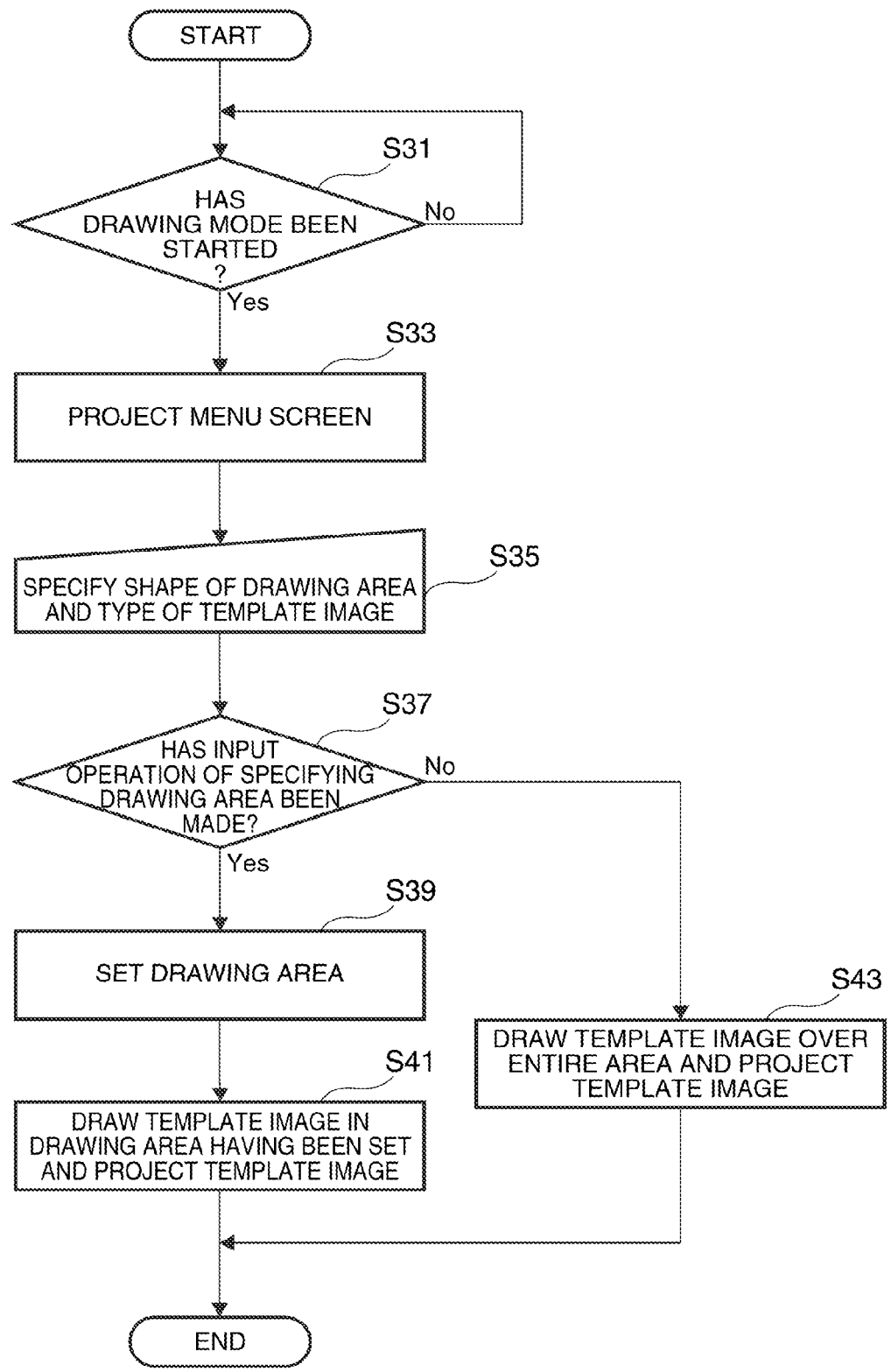
FIG. 10 is a flowchart for describing a process of setting a drawing area in Example 2.

Example 2 will next be described with reference to FIGS. 10 and 11. In Example 2, a description will be made of a process of specifying a drawing area from a setting menu.

The user uses an operation button on the remote control RC or the operation panel 44 to instruct to start the drawing mode in order to project ruler lines as a guide to writing characters when writing a minute of a conference or any other meeting on part of the whiteboard WB. Having received an operation signal from the operation signal processor 43, the controller 20 starts the drawing mode (step S31: Yes) and instructs the OSD processor 38 to produce OSD video images containing a drawing mode setting menu.

Figure 11:
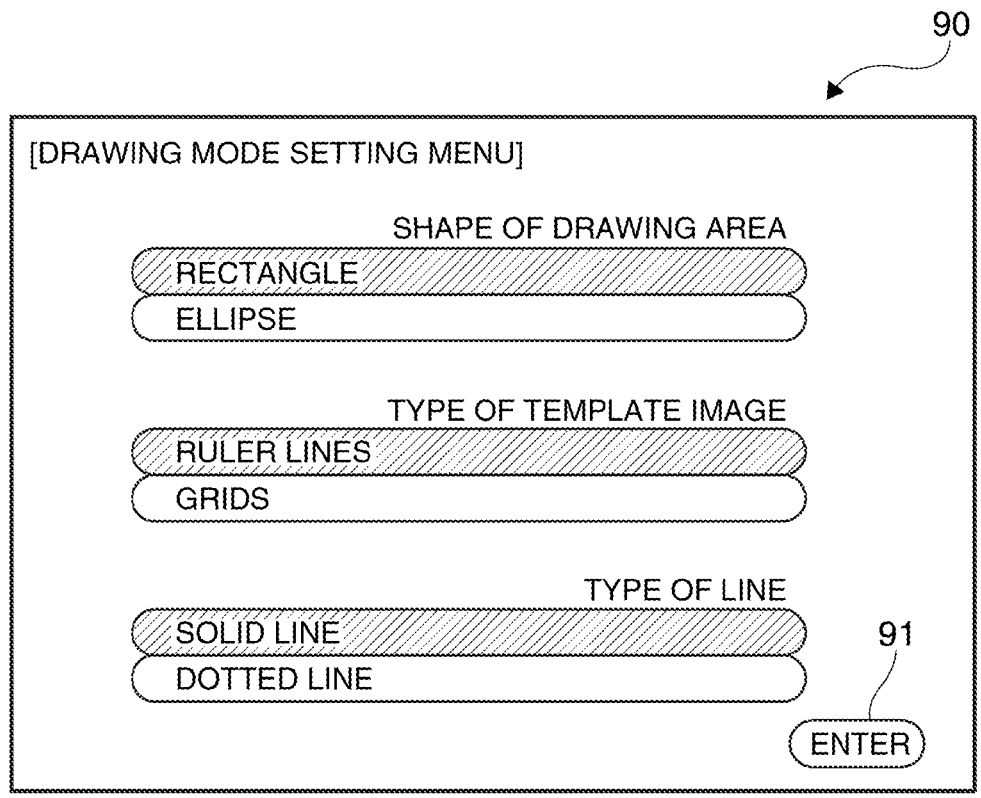
FIG. 11 shows an example of a drawing mode setting menu projected on a whiteboard.

When the projection system 13 projects video light carrying the OSD video images, a drawing mode setting menu 90 shown in FIG. 11 is projected on the whiteboard WB (step S33). The user selects a setting value on each setting item displayed in the drawing mode setting menu 90, for example, by using a selection button on the operation panel 44 or the remote control RC. In this example, the user can set the shape of the drawing area, the type of template image, and the type of line in the template image. For example, the user selects "rectangle" for the shape of the drawing area, "ruler lines" for the type of template image, and "solid line" for the type of line in the template image and presses an enter button 91 as a final action (step S35).

Having received a signal indicating that the enter button 91 has been operated from the operation signal processor 43, the controller 20 instructs the OSD processor 38 to produce and project video images that allow the user to perform input operation of specifying the drawing area. For example, a cursor "+" and an operation guidance sentence of "Specify start point" are first displayed, and after the start point is specified by using the enter button, an operation guidance sentence of "Specify end point" is displayed. To draw a rectangular drawing area, the user determines start and end points, whereby the user can specify a rectangular drawing area whose diagonal is determined by the start and end points. To draw an elliptical drawing area, the user determines start and end points, whereby the user can specify an elliptical drawing area having two focal points.

Having detected the input operation of specifying a drawing area described above (step S37: Yes), the controller 20 instructs the drawing area setting section 63 to set an area specified by the drawing area specifying operation as the drawing area (step S39). After the drawing area is set, the controller 20 instructs the template image generating section 64 to generate a template image to be drawn in the drawing area. The template image generating section 64 generates image data containing a template image drawn in the drawing area in response to the instruction from the controller 20, converts the image data into an RGB signal, and outputs it to the video processor 34.

The video processor 34 performs gamma correction, trapezoidal distortion correction, resolution conversion, and other image processing on the RGB signal carrying the image data received from the template image generating section 64 and outputs the resultant data to the liquid crystal light valve driver 14. The liquid crystal light valve driver 14 drives the liquid crystal light valves 12R, G, and B to form optical images according to the inputted RGB signal in the image modulation areas thereof, and the projection system 13 projects the optical images. That is, ruler lines are projected on part of the whiteboard WB when the liquid crystal light valve driver 14 draws the template image on the pixels corresponding to the drawing area within the image modulation areas of the liquid crystal light valves 12R, G, and B (step S41).

On the other hand, when the controller 20 has not detected any input operation of specifying a drawing area in step S37 (step S37: No), the controller 20 instructs the template image generating section 64 to generate a template image to be drawn over the entire image modulation areas of the liquid crystal light valves 12R, G, and B based on the setting values inputted in step S35. The template image generating section 64 generates a template image drawn over the entire image modulation areas in response to the instruction from the controller 20, converts the template image into an RGB signal, and outputs it to the video processor 34.

The video processor 34 performs gamma correction, trapezoidal distortion correction, resolution conversion, and other image processing on the RGB signal carrying the template image received from the template image generating section 64 and outputs the resultant data to the liquid crystal light valve driver 14. Solid ruler lines are projected substantially over the entire whiteboard WB (step S43) when the liquid crystal light valve driver 14 draws the template image according to the inputted RGB signal on the pixels corresponding to the image modulation areas of the liquid crystal light valves 12R, G, and B.

The coordinates of any of the drawing areas and the setting information set in Examples 1 and 2 described above may be stored in the rewritable, nonvolatile storage section provided in the controller 20. Storing the data in the nonvolatile storage section allows the setting values to be read when the projector 1 is turned off and restarted and the same template image to be displayed in the same position.

As described above, according to the projector of the present embodiment, since the drawing area 75A where the template image 77A is drawn can be set, the template image 77A will not be drawn outside the drawing area. That is, since the template image 77A is projected only on part of the whiteboard WB, the template image formed, for example, of ruler lines or grids projected on the whiteboard WB will not prevent the user from writing other notes in the other portion and allows the user to use the whiteboard WB for other purposes.

The above embodiment has been described with reference to a liquid crystal light valve-based projector in which the light from the light source is modulated by the liquid crystal light valves 12R, G, and B, which are light modulators, and then projected. The invention is also applicable to differently configured projectors, specifically to a projector using a DMD (Digital Micromirror Device), which uses a technology called DLP® (Digital Light Processing). That is, DLP is a technology in which white light emitted from a lamp is collected through a lens and incident on a DMD and the light from each DMD mirror that is turned on and hence inclined is enlarged through another lens and projected on a screen. The invention is also applicable to a projector based on the technology described above.

What is claimed is:

1. A projector comprising:
   an image modulation section that modulates light emitted from a light source in accordance with a video signal to form an optical image;
   a projection section that projects the optical image on a projection surface;
   a drawing area setting section that sets a drawing area within a specified portion of an image modulation area where the light is modulated to form the optical image, the portion of the image modulation area within which the drawing area is set being specified by drawing area specifying information provided by a user, the drawing area being an area where a template image is drawn; and
   a template image generating section that generates the template image to be drawn in the drawing area,
   wherein
      the template image generating section does not generate the template image to be drawn in a portion of the image modulation area that is outside the drawing area, and
      the drawing area specifying information provided by the user specifies one or more positions within the drawing area and comprises a plurality of area specifying marks that specify a plurality of points on an edge of the drawing area.

2. The projector according to claim 1,
   further comprising an imaging section that captures an image projected through the projection section,
   wherein the drawing area setting section sets the drawing area based on drawing area specifying information contained in the image captured by the imaging section.

3. The projector according to claim 1,
   wherein the drawing area setting section sets the drawing area in accordance with drawing area specifying operation for specifying the drawing area.

4. The projector according to claim 1,
   wherein the drawing area setting section sets the shape of the drawing area in accordance with an input of shape specifying information for specifying the shape of the drawing area.

5. The projector according to claim 1,
   wherein the template image generating section generates the template image in accordance with the size of the drawing area.

6. The projector according to claim 1,
   wherein the template image generating section generates the template image in accordance with an input of type specifying information for specifying the type of the template image.

7. The projector according to claim 1, wherein the one or more area specifying marks are handwritten on the projection surface.

8. The projector according to claim 3, wherein the area specifying marks are drawn on the projection surface by the drawing area specifying operation.

9. A method for controlling a projector including an image modulation section that modulates light emitted from a light source in accordance with a video signal to form an optical image and a projection section that projects the optical image on a projection surface, the method comprising:
   setting a drawing area within a specified portion of an image modulation area where the light is modulated to form the optical image, the portion of the image modulation area within which the drawing area is set being specified by drawing area specifying information provided by a user, the drawing area being an area where a template image is drawn; and
   generating the template image to be drawn in the drawing area,
   wherein
      the template image is not generated to be drawn in a portion of the image modulation area that is outside the drawing area, and
      the drawing area specifying information provided by the user specifies one or more positions within the drawing area and comprises a plurality of area specifying marks that specify a plurality of points on an edge of the drawing area.

10. The method according to claim 9, further comprising:
    capturing an image projected through the projection section,
    wherein the drawing area is set based on drawing area specifying information contained in the image captured by the imaging section.

11. The method according to claim 9, wherein
    the drawing area is set in accordance with drawing area specifying operation for specifying the drawing area.

12. The projector according to claim 9,
    wherein the shape of the drawing area is set in accordance with an input of shape specifying information for specifying the shape of the drawing area.

13. The projector according to claim 9,
    wherein the template image is generated in accordance with the size of the drawing area.

14. The projector according to claim 9,
    wherein the template image is generated in accordance with an input of type specifying information for specifying the type of the template image.

15. The projector according to claim 9, wherein the one or more area specifying marks are handwritten on the projection surface.

16. The projector according to claim 11, wherein the area specifying marks are drawn on the projection surface by the drawing area specifying operation.

* * * * *